United States Patent [19]

Young et al.

[11] 4,447,748

[45] May 8, 1984

[54] HIGH TEMPERATURE CORROSION AND EROSION RESISTANT ELECTRODE

[75] Inventors: William E. Young; Richard H. Lunn; David H. Archer, all of Pittsburgh, Pa.

[73] Assignee: Westinghouse Electric Corp., Pittsburgh, Pa.

[21] Appl. No.: 257,682

[22] Filed: Apr. 27, 1981

[51] Int. Cl.³ .............................................. H02N 4/02
[52] U.S. Cl. ........................................................ 310/11
[58] Field of Search ........................................... 310/11

[56] References Cited

U.S. PATENT DOCUMENTS

| | | | |
|---|---|---|---|
| 3,480,805 | 11/1969 | Verrell | 310/11 |
| 3,508,087 | 4/1970 | Millet et al. | 310/11 |
| 4,128,776 | 12/1978 | Boquist et al. | 310/11 |
| 4,185,213 | 1/1980 | Scannell | 310/11 |

*Primary Examiner*—Donovan F. Duggan
*Attorney, Agent, or Firm*—W. E. Otto

[57] ABSTRACT

High temperature corrosion and erosion resistant electrodes particularly useful for magnetohydrodynamic generators which electrodes utilize chemical ionization of combustion reactants to diffuse the current flow into the electrode. A combustible fuel, oxidant and electrically conductive material flow through porous, graded electrode components toward the plasma. Catalyzed combustion occurs near the face of the electrode exposed to the plasma which diffuses current transfer in the boundary layer and into the electrode. The reactants and combustion products thus combine simultaneously to cool the inner portions of the electrode, heat the outer portions, protect the exposed electrode surface from erosion, and alleviate the physical or chemical bonding of the by-products of coal combustion to the electrode surface which otherwise results in chemical degradation of the electrode.

10 Claims, 2 Drawing Figures

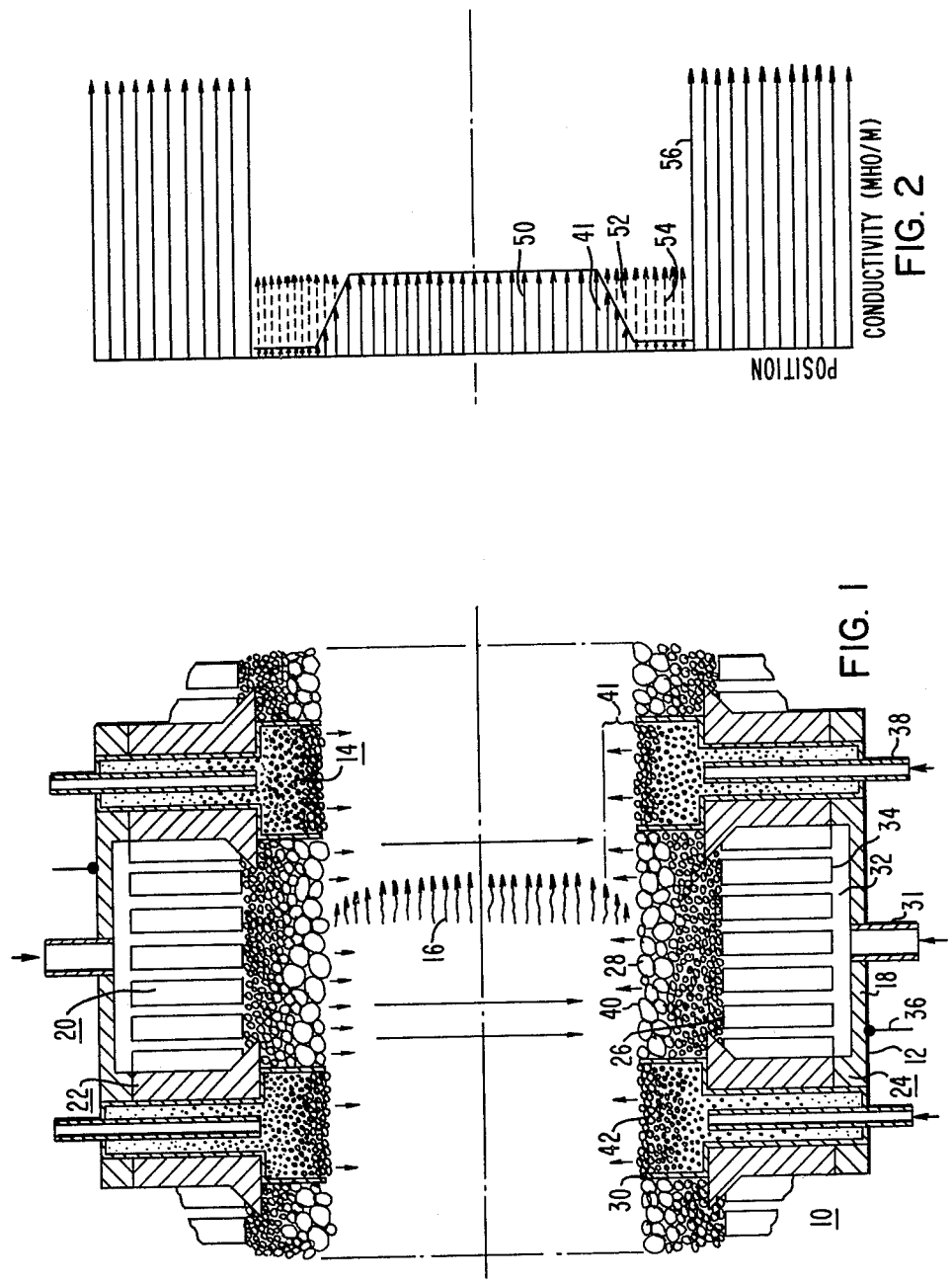

HIGH TEMPERATURE CORROSION AND EROSION RESISTANT ELECTRODE

BACKGROUND OF THE INVENTION

1. Field of the Invention

This invention relates to electrodes operating in a high temperature and erosive environment such as exists in an MHD generator channel.

2. Description of Material Art

A magnetohydrodynamic (MHD) generator transforms heat energy into electrical energy through utilization of the motion of an electrically conductive plasma in the presence of electric and magnetic fields. The motion induces an electromotive force between opposing electrodes, or walls comprising a plurality of electrodes which, in conjunction with insulating walls, form a duct. The plasma typically comprises ionized materials formed from combustion of fossil fuels such as coal, and includes a conductive seed material as well as combustion products. The plasma flows through the duct at a high temperature, on the order of 2500° C., and at a high velocity, approximately 800 meters per second for systems operating in a subsonic regime, or approximately 1200 meters per second for systems operating in a supersonic regime.

The rapid motion of the high temperature plasma can seriously erode the electrodes. Additional damage can be caused from chemical or physical bonding of combustion products, typically referred to as slag, on the electrodes. Once bonding occurs, chemical reaction of the slag with the electrode can result in severe degradation. Damage can also be done to the electrodes by internal arcs, which are the primary mode of current transfer from the plasma to the electrodes. Damage from arcing is particularly severe when the electrode surface exposed to the plasma is below approximately 1800° C. Even where the electrode surface becomes coated with slag, arcing can persist through the coating so as to damage the electrode surface. Several concepts have been proposed to alleviate electrode erosion and corrosion in MHD and other applications. For example, arc heaters have been tested where a magnetic field was applied in a manner to cause the arc to move along the electrode surface. However, the arcs still formed erosion tracks and had a tendency to stop moving and burn cavities in the electrode surface.

Attempts have also been made to continuously build up electrode surfaces in an MHD duct by continuously feeding material into the boundary layer formed between the electrode surface and the flowing plasma. While such systems appear promising, concerns are raised as to the excessive buildup and related heat transfer effects. Sacrificial electrodes have also been proposed, which, however, require a controlled motion of the electrode and associated control equipment and, would not eliminate slag deposition.

Also proposed have been so-called gas electrodes having a cavity or slots from which gaseous plumes are emitted into an MHD duct. The gaseous jet, which forms the electrode, is ionized in the cavity using microwave or radio frequency energy and, through use of a magnetic field, caused to swirl in the cavity in order to distribute current. It is difficult and power consumptive to achieve such ionization, and difficult to control.

It is therefore desirable to provide electrodes which can operate in high temperature erosive and corrosive environments such as that existing in MHD generator ducts.

SUMMARY OF THE INVENTION

This invention provides electrodes for operation in high temperature erosive and corrosive environments, prone to formation of electric arcs, which electrodes alleviate damaging arcing while maintaining good current transfer and acceptable temperature conditions within the electrode. Also alleviated is the tendency for buildup of undesirable deposits on the electrodes, which cause chemical corrosion of electrode components.

The electrode provides an exposed surface which operates at a high temperature and which also diffuses the current flow over the electrode surface. It simultaneously cools the substrate below the electrode surface, alleviating thermally related cycling and damage.

The electrode includes a metallic, electrically conductive box-like casing having an open front. Pressed within the casing is a porous distributor element. The distributor element can be a graded ceramic material which is electrically conductive at the operating temperature and sufficiently porous to allow passage of a reaction mixture therethrough. Nickel-bonded zirconium diboride is an acceptable material. Atop the distributor plate is an electrically conductive matrix including a combustion catalyst. A porous matrix of platinized ceramic is preferred.

In operation combustible reactants are fed into the casing and diffused through the porous distributor element and into the matrix. The reactants, including a fuel and an oxidant, are chosen so as to pass through the distributor element and act as a cooling medium, and to combust in the matrix region. The combustion provides a high temperature in the matrix region and an ionic distribution which fosters diffuse electrical conductivity. Greater electrical conductivity can be provided by adding an easily ionized material such as alkali vapor to the reactants.

BRIEF DESCRIPTION OF THE DRAWINGS

The advantages, nature and additional features of the invention will become more apparent from the following description, taken in connection with the accompanying drawings, in which:

FIG. 1 is a cross-sectional view of an electrode wall for an MHD generator in accordance with the invention; and FIG. 2 is a graphic representation of electrical conductivity along the electrodes and the adjacent plasma.

DESCRIPTION OF THE PREFERRED EMBODIMENTS

Referring now to FIG. 1 there is shown a portion of a channel wall 10 of a magnetohydrodynamic (MHD) generator. The wall 10 includes a plurality of electrodes 12 segregated by insulting segments 14. Adjacent the wall 10 is a flowing plasma, indicated by reference numeral 16. A typical wall 10 of a linear MHD generator can include numerous electrodes 12 and insulating segments 14. The disclosed electrode is equally applicable to a disc-type MHD generator where only two opposing electrodes 12 are utilized. In a linear generator, each electrode is preferably rectangular or trapezoidal in lateral cross-section. For a disc generator, the equivalent cross-section is preferably circular.

Each electrode 12 includes a casing 18 constructed of a material having good thermal and electrical conduction characteristics. The casing 18 is thus formed preferably of a metallic material, such as copper. The casing 18 laterally surrounds and supports a distributor element 20. To facilitate fabrication, the casing 18 comprises two sections 22, 24, and the distribution element 20 is pressed into the larger section 22.

The distributor element 20 comprises a material permeable to gas flow which has good electrical conductivity at high temperatures as well as at ambient environmental temperatures of approximately 21° C. Permeability can be provided by the inherent structure of the material, or through fabricated minute channels. The upper surface 26 of the distributor element 20 will experience operational temperatures which are excessive for most metals. Accordingly a ceramic, or a cermet material, such as nickel-bonded zirconium diboride ($ZrB_2$) is preferably utilized.

Above the distributor element is a porous electrically conductive matrix 28 of a refractory material. The matrix 28 comprises an electronically or ionically conductive material such as yttria-stabilized zirconia, lathanum chromite, doped indium oxide or pyrolitic carbon, among other candidate materials. A conductive composite material such as an aluminum oxide-platinum cermet or a ceria ceramic impregnated with palladium, among others, can also be utilized. A combustion catalyst, such as platinum, is disposed throughout the matrix 28. The matrix 28 can be pressed into the casing and onto the distributor element, and laterally supported between an electrically insulating ceramic plate 30. The porosity of the matrix 28, and the distributor element 20, can be controlled by insertion of thermally degradable material such as rayon plastic fiber before pressing and subsequent heating. The casing 18 includes one or more inlets 31 for injecting reactants including a combustible fuel and an oxidant into a plenum 32. The fuel and oxidant can be premixed, or separately injected into the plenum 32, the distributor element 20, or the matrix 28. The plenum 32 distributes the combustion reactants along a rear face 34 of the distributor element. Also communicating with the casing 18 is an electrical lead 36 through which current is withdrawn from the electrode 12.

The electrical insulating segments 14 can comprise well-known insulating materials. The segments 14 can also be constructed to allow throughput of a cooling gas, such as air, which enters a porous segment 14 through an inlet 38. Materials such as magnesium oxide (MgO) or zirconium oxide ($ZrO_2$) can be utilized.

During operation the combustible reactants are fed into the plenum 32 and diffused through the distributor element 20 and into the matrix 28. The reactants are injected at a low temperature, in the range of 21° C., and thus provide a cooling of the electrode components, particularly the distributor element 20. The reactants progressively increase in temperature and reach a combustion temperature in the catalyzed matrix. For example, in the presence of platinized ceramic, combustion of methane and air could initiate at approximately 540° C. Upon combustion localized heating of the matrix and ionization occurs, distributing ionic species within the matrix 28, along a front surface 40 of the matrix, and within the boundary layer 41 of the flowing plasma adjacent the matrix surface 40. The distributed combustion species thus maintain a high temperature level within the matrix 28 and a diffuse mode of current flow from the plasma into the electrode 12. The distributed, diffuse current flow alleviates the potential for detrimental arcing.

Additional diffuse conductivity can be obtained by adding a seed material to the reactants. For example, potassium vapor or an organic seed with a selective boiling point, such as potassium 2-ethyl hexoate in a light oil carrier, can be added to a fuel such as carbon monoxide, methane or other hydrocarbons, or vaporized diesel oil.

Where a cooling fluid such as air is passed through the insulating segments 14, a cooler boundary layer is provided at a front surface 42, increasing electrical resistance and decreasing Hall current flow paths.

FIG. 2 shows qualitatively the electrical conductivity across the plasma 16 and the disclosed electrode 12. The conduction at the central region 50 of the plasma is approximately five Mhos per meter and, without the inventive electrode, decreases in the boundary layer region 41 to a low value, on the order of 0.1 Mhos per meter. However, as indicated by dashed arrows 52, the conductivity is enhanced in this region by the ionic combustion products exiting the electrode 12. A similar conductivity enhancement, indicated by dashed arrows 54, occurs across the electrode matrix 28. The conductivity through the metallic casing 18 is high, indicated by arrows 56, on the order of 5800 Mhos per meter.

In order to increase beneficial cooling of the distributor element 20, the element 20 can be graded such that it is more dense toward the rear face 34 and less dense toward the upper surface 26. The matrix 28 can similarly be graded to a lower density toward the front surface 40, to enhance diffuse reaction species distribution. Additionally, the combustion catalyst can be selectively and progressively distributed throughout the matrix 28. For example, that portion of the matrix closer to the distributor element 20 can include a small, or no distribution of catalytic material, while the portion closer to the plasma includes a high catalytic material distribution. Selective distribution of the combustion catalyst can thus be used to adjust the electrode temperature profile as well as to adjust the concentration of charged, non-equilibrium combustion intermediates throughout the electrode and in the plasma boundary layer, resulting from the chemical ionization during combustion.

With the disclosed electrode structure, current flows from the plasma 16, diffusely into the matrix 28, and through the casing 18 and distributor element 20 to the electrical lead 36. Arcing is alleviated while the temperature of the electrode components, other than the front surface of the matrix, is maintained at acceptably low temperatures. Additionally, a continuous throughput of reactants and reaction products discharging from the electrode into the plasma alleviates the potential for buildup of a slag deposit on the electrode and the insulating segment surfaces. Alleviation of slag buildup lessens electrode degradation due to chemical interaction of the slag and the electrode structures. Temperature control and a lowered density of components, particularly ceramics, alleviates the damaging effects of thermal cycling and the potential for component failure.

We claim:
1. An electrode for a magnetohydrodynamic generator through which flows a high temperature plasma, comprising:
   a metallic casing;
   a porous distributor element, comprising a ceramic material, supported within said casing;

a porous, substantially electronically conductive matrix, comprising a ceramic material separating said distributor element and said casing from said plasma;

means for serially flowing combustion reactants through said distributor element, said matrix, and into said plasma;

means within said matrix for combusting said combustion reactants.

2. The electrode of claim 1 wherein said means within said matrix for combusting said combustion reactants comprises a combustion catalyst.

3. The electrode of claim 2 wherein said combustion catalyst is platinum.

4. The electrode of claim 2 wherein said catalyst is selectively distributed within said matrix, being more densely distributed at a portion of said matrix closer to said plasma than at a portion of said matrix farther from said plasma.

5. The electrode of claim 1 wherein said distributor element is disposed within said casing so as to form a plenum between a surface of said distributor element and a surface of said casing.

6. The electrode of claim 1 wherein said distributor element is selectively graded, being less dense approaching said plasma.

7. The electrode of claim 1 wherein said matrix is graded, being less dense approaching said plasma.

8. A method of operating a magnetohydrodynamic generator through which a plasma flows, said generator including a plurality of electrodes, said method comprising:

flowing a combustible, fluid mixture into said electrode and combusting said mixture within said electrode and generating ionic species.

9. The method of claim 8 further comprising mixing a conductive material with said combustible mixture.

10. The method of claim 8 wherein said combustible mixture comprises oxygen and a carbonaceous material.

* * * * *